(12) United States Patent
Kasubowski et al.

(10) Patent No.: US 7,815,044 B2
(45) Date of Patent: Oct. 19, 2010

(54) PACKAGE FOR A SAW BLADE OR SIMILAR PRODUCT

(75) Inventors: Catherine M. Kasubowski, Charlotte, NC (US); Timothy R. Meyer, Lincoln, NE (US); Scott Marchant, North Auckland (NZ); Bryce Dahl, Puhoi (NZ); Michael Kelly, Warkworth (NZ)

(73) Assignee: Irwin Industrial Tool Company, Huntersville, NC (US)

( * ) Notice: Subject to any disclaimer, the term of this patent is extended or adjusted under 35 U.S.C. 154(b) by 275 days.

(21) Appl. No.: 12/107,409

(22) Filed: Apr. 22, 2008

(65) Prior Publication Data

US 2009/0261005 A1    Oct. 22, 2009

(51) Int. Cl.
A45C 11/26 (2006.01)
(52) U.S. Cl. .................... 206/349; 206/303; 206/493
(58) Field of Classification Search ................. 206/349, 206/303, 493, 467, 308.1, 309, 310, 311, 206/312, 372, 373; D6/407; D3/315; D9/415
See application file for complete search history.

(56) References Cited

U.S. PATENT DOCUMENTS

| | | | | |
|---|---|---|---|---|
| 2,950,004 A | * | 8/1960 | Acomb | 206/349 |
| 5,078,266 A | * | 1/1992 | Rackley | 206/349 |
| 5,456,057 A | * | 10/1995 | Bannon et al. | 53/449 |
| D397,934 S | * | 9/1998 | Giulianelli | D9/415 |
| 6,729,468 B1 | * | 5/2004 | Dobmeier | 206/303 |
| 6,868,966 B2 | * | 3/2005 | German, III | 206/349 |
| 7,066,327 B2 | * | 6/2006 | Baublitz et al. | 206/349 |
| 7,537,118 B2 | * | 5/2009 | Hansen | 206/470 |
| 2007/0130811 A1 | * | 6/2007 | Shevelev et al. | 40/312 |
| 2009/0057184 A1 | * | 3/2009 | Leaman | 206/532 |

* cited by examiner

*Primary Examiner*—Ehud Gartenberg
*Assistant Examiner*—Ernesto A Grano
(74) *Attorney, Agent, or Firm*—Dennis J. Williamson; Moore & Van Allen, PLLC (57) ABSTRACT

A package is provided for a saw blade that includes a paperboard back secured to a transparent plastic front. The plastic front includes an edge border that is reinforced to support the weight of the saw blade and that may extend over the edge of the paperboard back for the periphery thereof. The plastic front includes a pocket for receiving the blade where the pocket is provided with projections for engaging the blade to keep the blade from moving once inside the package. A peg is also provided in the plastic cover that engages a portion of the saw blade to ensure that the saw blade is properly oriented in the package during the packaging process. A portion of the back is not adhered to the plastic front to provide an easy opening access between the plastic front and the paperboard back.

17 Claims, 9 Drawing Sheets

PACKAGE FOR A SAW BLADE OR SIMILAR PRODUCT

The invention relates generally to packaging and more particularly to packaging particularly suitable for use with saw blades.

BACKGROUND

Saw blades, such as circular saw blades, typically comprise a relatively flat, heavy article made of hardened steel or other strong, rigid material. A plurality of relatively sharp teeth are formed around the periphery of the saw blade for cutting an article during use. The size, weight and sharpness of the saw blades make packaging of the blades difficult. Further, theft prevention of the blades must be considered in any blade package.

Saw blades have been packaged in full clam shells where the package comprises a clear plastic package folded along one edge to create full plastic front and back sides. The front and back sides are joined together by pressure buttons to seal the clam shell. While such an arrangement retains the saw blades, the full clam shell uses a significant amount of relatively expensive plastic material. The sealing of the clam shell is also labor intensive. As a result, the full plastic clam shell is an expensive package. Also, the sustainability of such packaging from an environmental perspective is less than desirable because of the relatively large amount of plastic that is used. Another type of packaging for saw blades is described in U.S. Pat. No. 6,729,468 where a relatively thick molded plastic case is used to retain the saw blades. Such a package also uses a relatively large amount of plastic and does not completely isolate the saw blade from the external environment. Other similar saw blade packages comprise a relatively thick molded shell that covers the front and back of the blades. Such packages also use a relatively large amount of plastic and may cover significant portions of the front of the blade such that it may be difficult for a prospective purchaser to inspect the blade. Skin cards are also used for packaging saw blades. Skin cards typically comprise a sheet of paperboard on which the saw blade is placed where a thin sheet of transparent plastic is heat sealed over the product. Skin cards use less material, but are more labor intensive than clam shells and the package does not stand up well to the heavy, sharp saw blades.

An improved package for a saw blade is desired.

SUMMARY OF THE INVENTION

A package is provided for a saw blade that includes a paperboard back secured to a transparent plastic front. The plastic front includes an edge border that is reinforced to support the weight of the saw blade and that may extend over the edge of the paperboard back for the periphery thereof. The plastic front includes a pocket for receiving the blade where the pocket is provided with projections for engaging the blade to keep the blade from moving or rotating once inside the package. A peg is also provided in the plastic cover that engages a portion of the saw blade to ensure that the saw blade is properly oriented in the package during the packaging process. A portion of the back is not adhered to the plastic front to provide an easy opening access between the plastic front and the paperboard back.

DETAILED DESCRIPTION OF PREFERRED EMBODIMENTS OF THE INVENTION

Referring to the Figures the package 1 of the invention comprises a plastic front 4 and a paperboard back 2 with a saw blade 6 disposed therebetween. While one embodiment of a saw blade is illustrated the saw blade may be of any size, style, configuration and shape. Further, the package of the invention may be used to hold other similar products. The front 4 may be made transparent to allow visual inspection of the saw blade 6 or other product.

Figure 5:
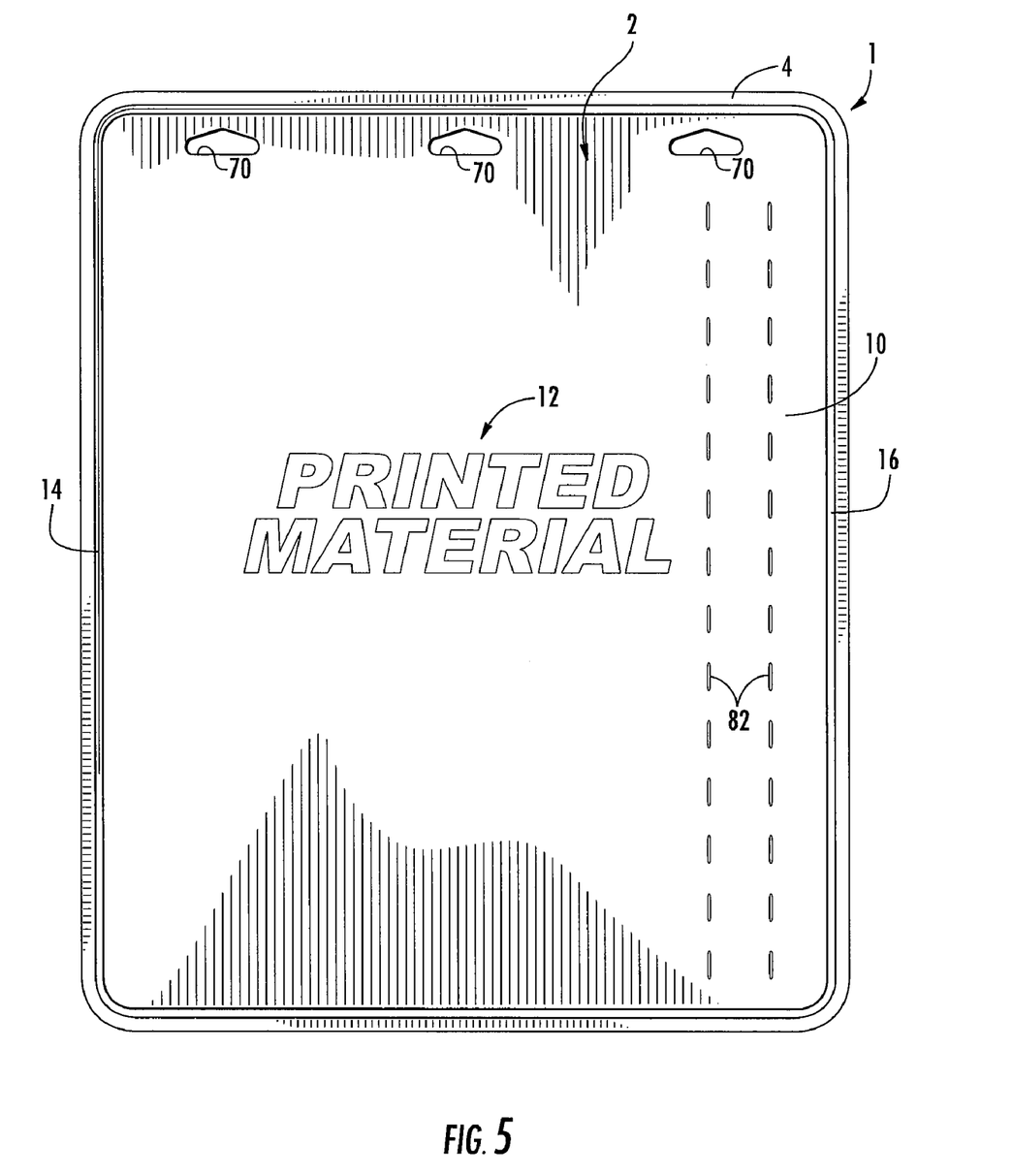
FIG. 5 is a back view of the back of the package.

The back 2 may be of any shape. In one embodiment the back 2 is generally rectangular and has printed material 12 formed on the front surface 8 and back surface 10 (FIG. 5) providing branding information, product information or the like. In the illustrated embodiment the back 2 is dimensioned to be only slightly greater than the saw blade 6 in one dimension such that the saw blade extends from substantially the first edge 14 to the second edge 16. The arrangement of the product close to at least one edge of the back provides an easy opening package as will hereinafter be described. The back 2 has a pressure/heat activated adhesive 9 over its entire front surface 8 that joins the back 2 to front 4 as will hereinafter be described.

Figure 2:
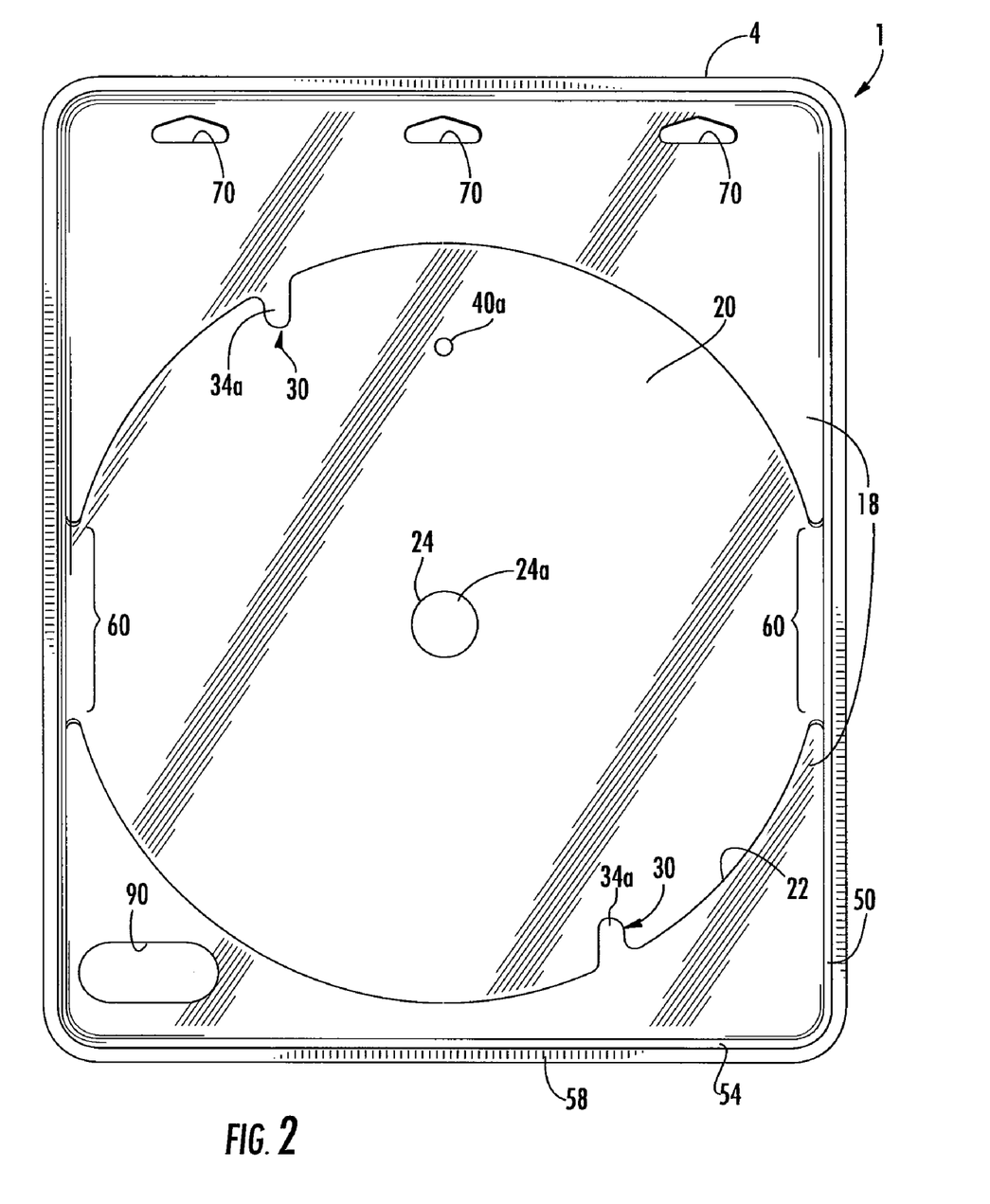
FIG. 2 is an inside view of an embodiment of the front of the package.
Figure 3:
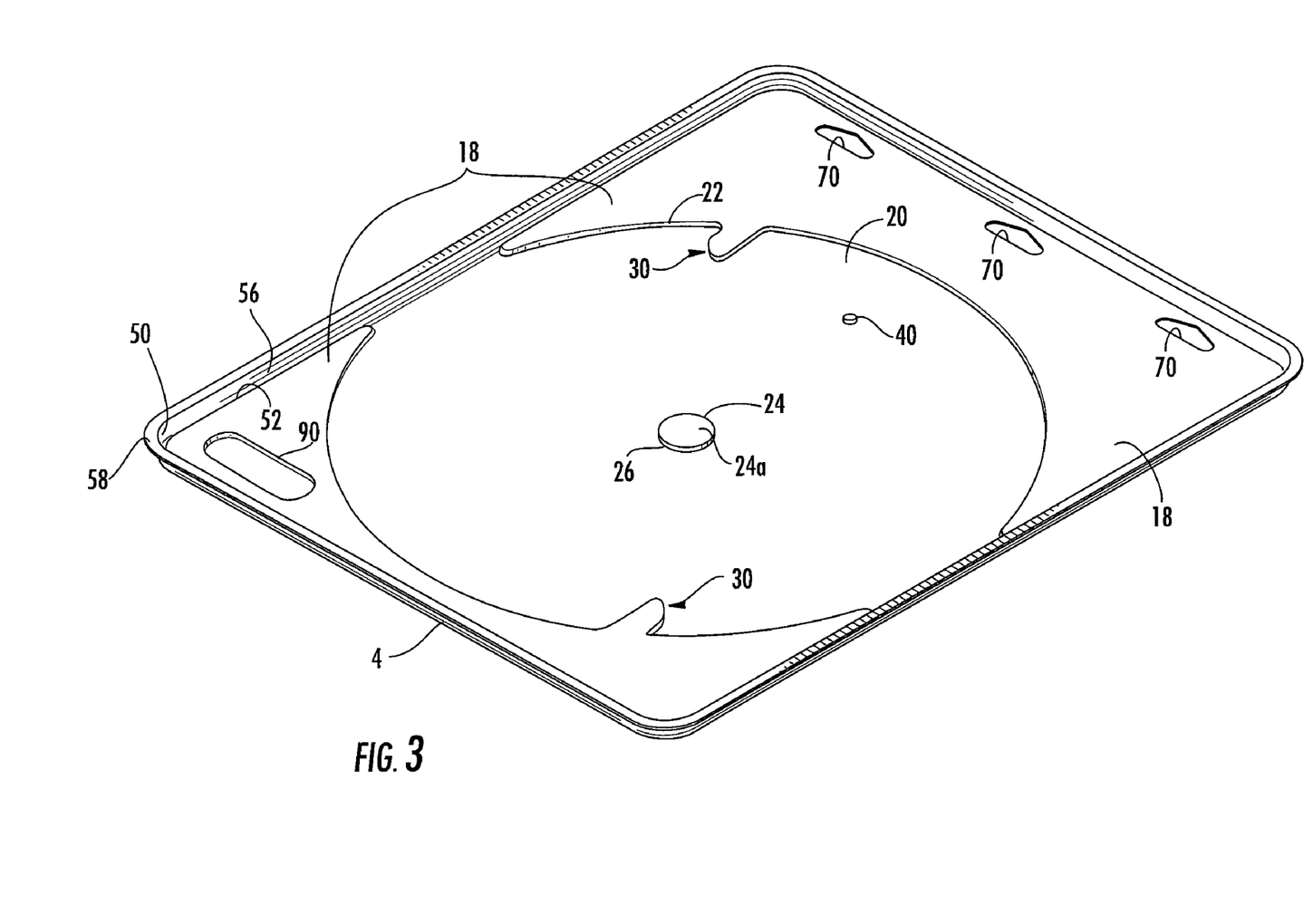
FIG. 3 is a perspective inside view of the front of the package of FIG. 2.

The plastic front 4 is formed separately from the back 2 and is attached to the back in a separate process. Referring to FIGS. 2 and 3 the plastic front 4 is formed with planar portions 18 that are joined to a product receiving pocket 20 at shoulder 22. In one embodiment the product receiving pocket 20 is shaped and dimensioned to closely receive the saw blade 6. A centering protrusion 24 is formed in the center of pocket 20 at shoulder 26 and is dimensioned to be closely received in the arbor hole 28 of saw 6. The end surface 24a of protrusion 24 is substantially coplanar with planar portion 18.

Figure 1:
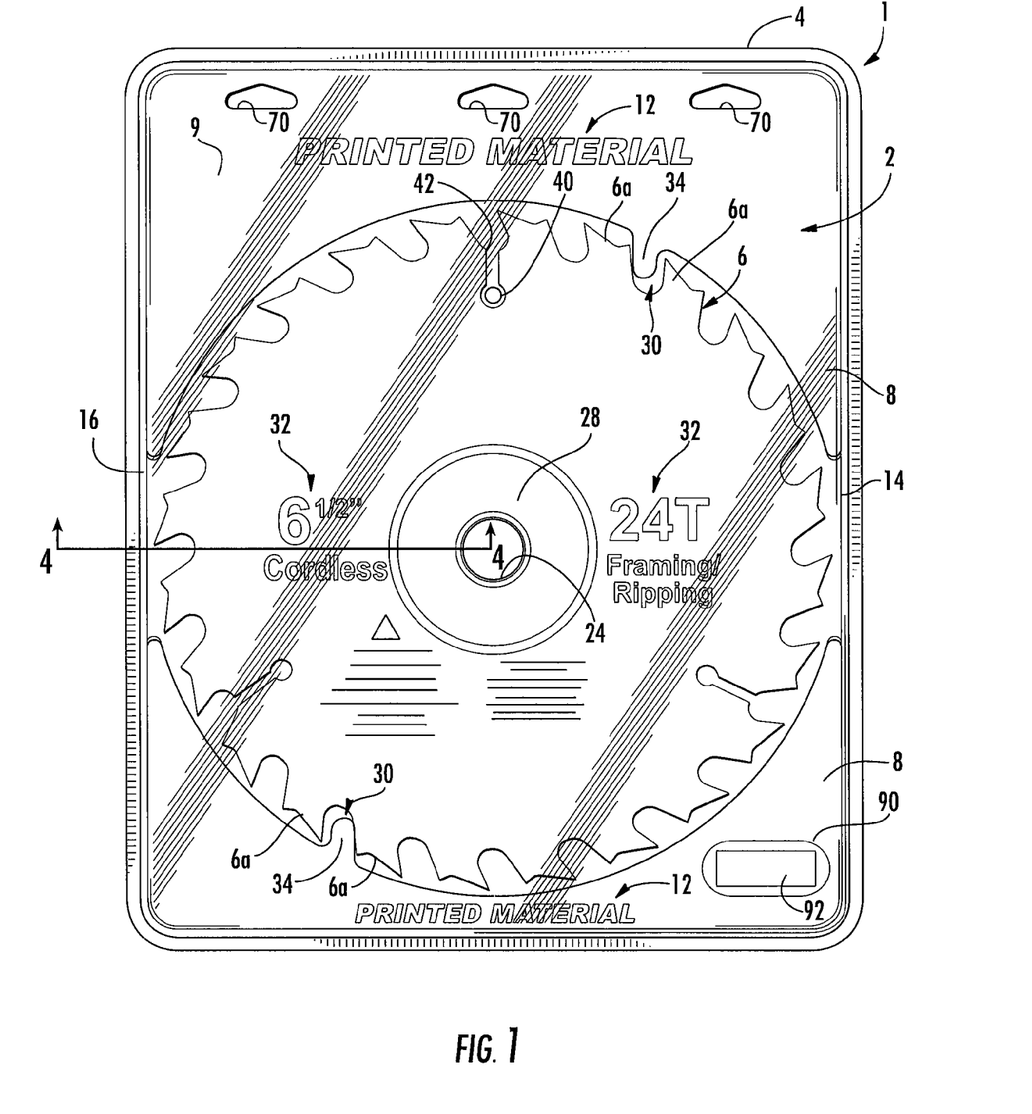
FIG. 1 is a front view of an embodiment of a package of the invention with a saw blade retained therein.

Referring to FIGS. 1 through 3 at least one lock member 30 is formed in the front 4 to prevent the saw blade 6 from rotating in the package. The lock member 30 is used to keep the saw blade 6 in the orientation in which it is loaded in the package during shipping and display. It is contemplated that the saw blade will include printed material 32 such as branding information, product information, consumer information or the like where the lock member 30 maintains the blade with the printed material oriented right side up relative to the package 1 such that the material is easily readable. The lock member 30 in one embodiment comprises a protrusion 34, 34a formed in the pocket 20 that extends between adjacent teeth of the saw blade 6. The protrusion 34, 34a may be molded integrally with front 4. The protrusion 34 acts as an abutment surface against which the teeth bear to prevent the saw from rotating within the package. The protrusion 34, 34a may substantially fill the space between adjacent teeth to prevent any rotation of the blade in the package. In the illustrated embodiment two lock members 30 are provided located approximately 180 degrees from one another around the periphery of the blade 6 although a greater or fewer number of lock members may be used. The protrusion 34, 34a may be sized to fit between the adjacent teeth of different type/size blades. For example, the protrusions 34 of the embodiment of FIG. 1 are larger than the protrusions 34a of the embodiment of FIG. 2.

A locator peg 40, 40a is also formed in the front 4 to engage a portion of the blade 6 to orient the blade relative to the package during packaging. During the packaging process the front 4 is placed face down on a surface such as a carousel and the blade 6 is inserted face down into the pocket 20. Because the blade is inserted face down it may be difficult to maintain the proper orientation of the blade relative to the package during the insertion process. By aligning a portion of the blade with the locator peg 40, 40a proper orientation of the blade is guaranteed. Specifically, peg 40, 40a is shaped and dimensioned to fit into a slot or aperture on blade 6 such as a heat vent or expansion slot 42 formed in the blade 6. In the illustrated embodiment of blade 6 the expansion slot 42 includes a circular portion 44 into which the circular peg 40, 40a is inserted. The alignment of the locator peg 40, 40a with the expansion slot 44 assures that the blade 6 is in the correct angular orientation relative to the package. It is to be understood that such expansion slots/heat vents come in a variety of shapes and sizes and that the locator peg 40, 40a will be dimensioned to mate with the specific expansion slot/heat vent of the saw 6 to be packaged. For example the peg 40 shown in FIG. 1 is sized differently and located in a different position than the peg 40a shown in FIG. 2 to mate with expansion slots/heat vents of different style blades. In addition to using the expansion slot/heat vent to mate with the peg a separate slot or aperture may be provided on the blade to mate with the peg.

The periphery of the front 4 is formed with a reinforcement structure that maintains the structural integrity of the package 1. The reinforcement structure is used because of the weight of the saw blade 6. The reinforcement structure comprises a U-shaped channel 50 formed around the periphery of the front 4. Channel 50 includes a sidewall 52 that extends from the planar portions 18 and terminates in a base 54 that connects to opposite sidewall 56. Sidewall 56 terminates in a flange 58 that extends from the front portion substantially parallel to planar portions 18. Flange 58 may extend for the entire periphery of the package 1 to simulate the look of a clam shell.

Figure 4:
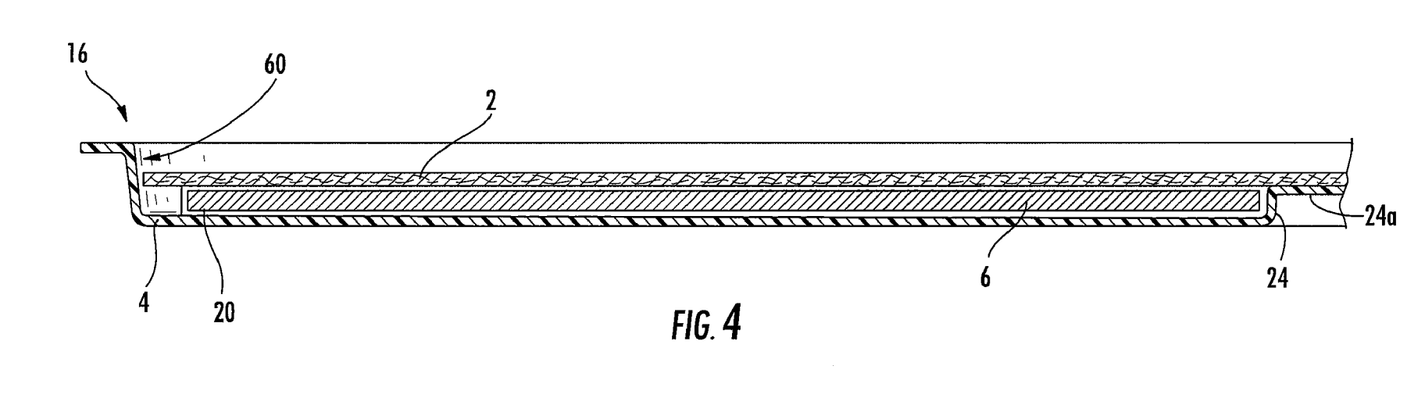
FIG. 4 is a section view taken along line 4-4 of FIG. 1.

Referring to FIG. 4, at the two edges 14 and 16 of the package gaps 60 are created between the front 4 and back 2. As a result when the adhesive 9 on the back 2 is activated by applying pressure and heat to the back 2 and front 4, the back 2 does not adhere to the front 4 in the area of the gaps 60. A user can then open the package by inserting a finger or other object into the gap 60 to tear the paperboard back and open the package. Because the pocket 20 extends substantially to the gap 60, easy access to the blade 6 is provided.

A plurality of openings 70 may be formed in the package to allow the package to hang from hooks in the retail outlet for ease of display. The openings 70 may be formed after the package is created by punching holes through the combined paperboard back 2 and plastic front 4 or the holes may be formed in each of the front and back independently and aligned when the front 4 is secured to the back 2.

The adhesive 9 on the paperboard back is activated by applying heat and pressure to the back 2 and front 4. In the illustrated embodiment the adhesive 9 is activated in planar sections 18 and 24a because those sections contact the back 2.

Because the package is relatively large, moisture in the paperboard back 2 is expelled from the paperboard when the heat and pressure are applied. It has been found that this moisture may have a deleterious effect on the adhesion of the back 2 to the front 4. To eliminate this problem, a plurality of openings such as slits 82 are formed in the paperboard back 2. While slits 82 are shown over a portion of back 2 to make the figure clearer, it is to be understood that the slits 82 may be formed over the entire surface of back 2. The slits 82 allow moisture to escape from the side of the paperboard back opposite the front 4. This minimizes the moisture trapped between the front 4 and back 2 and allows a strong bond to be formed by the adhesive between the front and back of the package.

A recessed portion 90 may also be formed in the front 4 for receiving and retaining an anti-theft device 92 such as an RFID. The anti-theft device 92 is located in the recessed portion 90 before the back 2 is secured to the front 4 such that the anti-theft device cannot be removed from the package without destroying the package.

Figure 6:
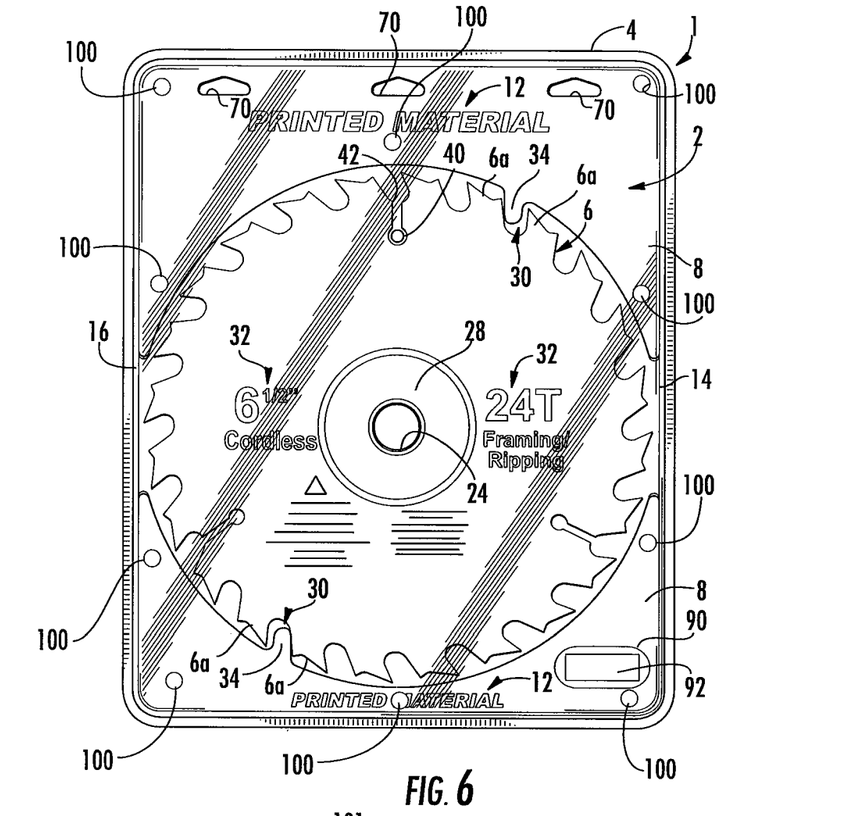
FIG. 6 is a front view of another embodiment of a package of the invention with a saw blade retained therein.
Figure 7:
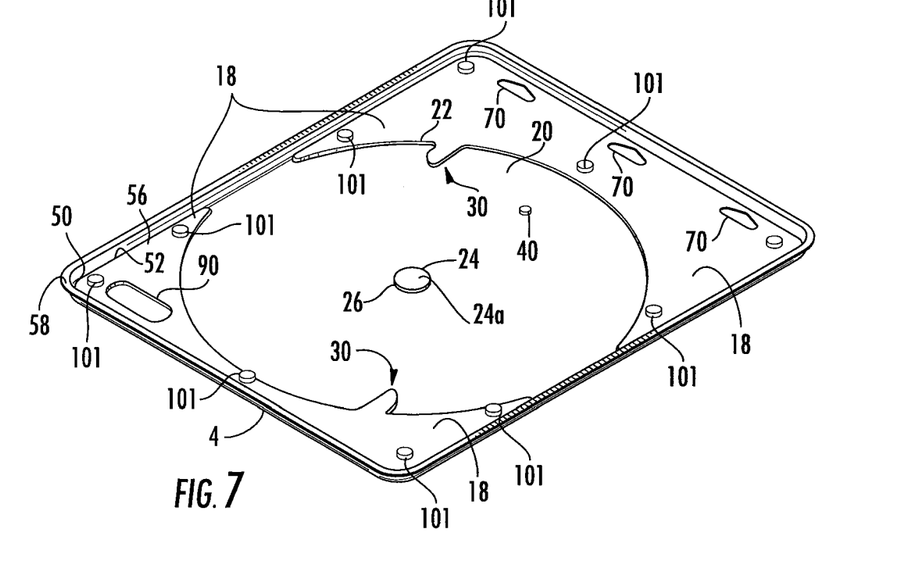
FIG. 7 is a perspective inside view of the front of the package of FIG. 6.
Figure 8:
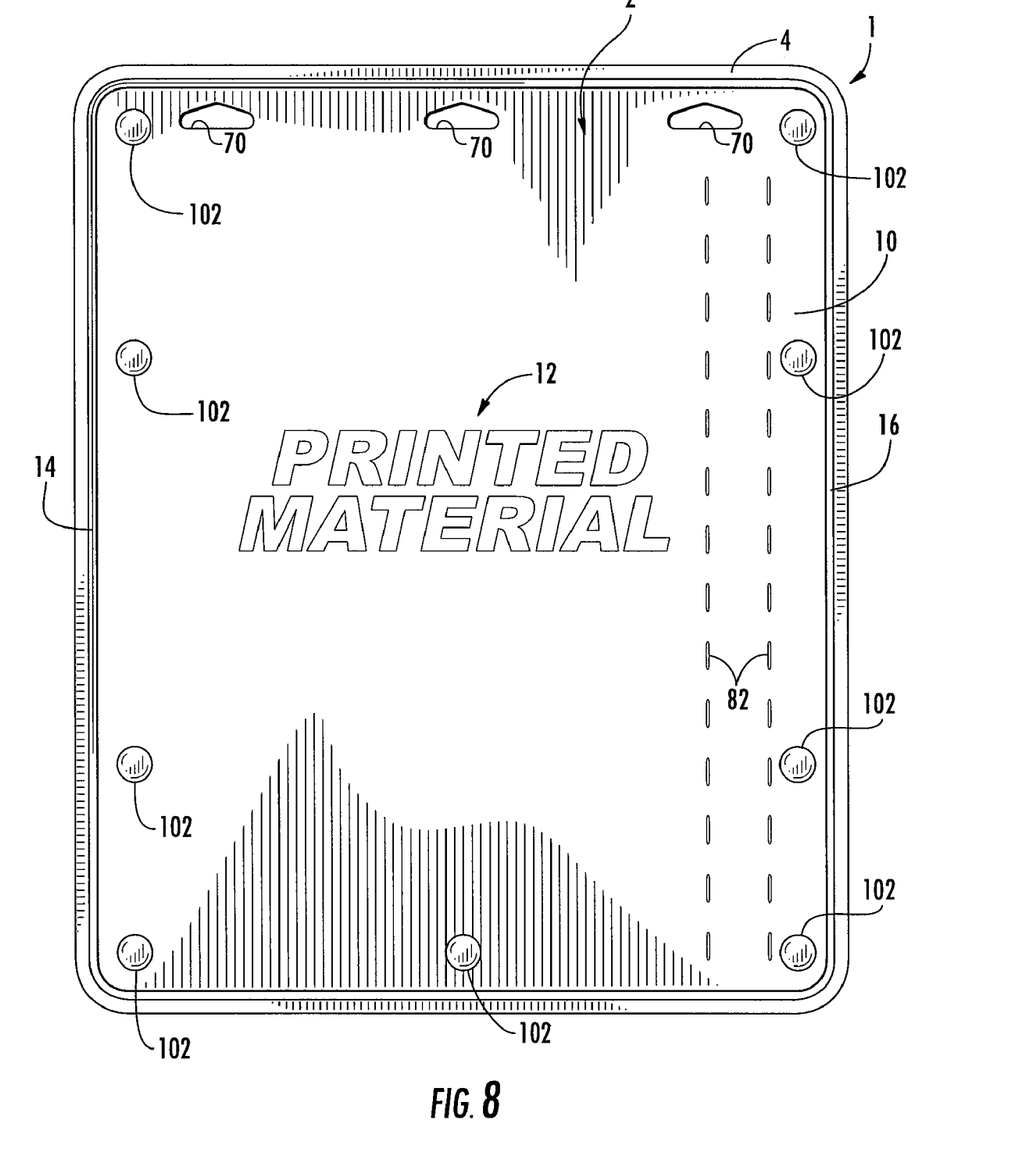
FIG. 8 is a back view of the back of the package of FIG. 6.

Referring to FIGS. 6 through 8 another embodiment of the package is shown where like reference numerals are used to refer to like components previously described with reference to FIGS. 1 through 5. The back 2 is secured to the front 4 using smash buttons 100. Smash buttons 100 comprise portions of the plastic front 4 formed as protrusions 101 extending from the front toward the back 2. The back 2 is placed on the front 4 such that the protrusions 101 extend through holes 102 formed in the back 2. After being inserted through the back 2 the protrusions 101 are smashed so as to spread out or otherwise deformed such that the protrusions cannot be removed from the holes 102.

Figure 9:
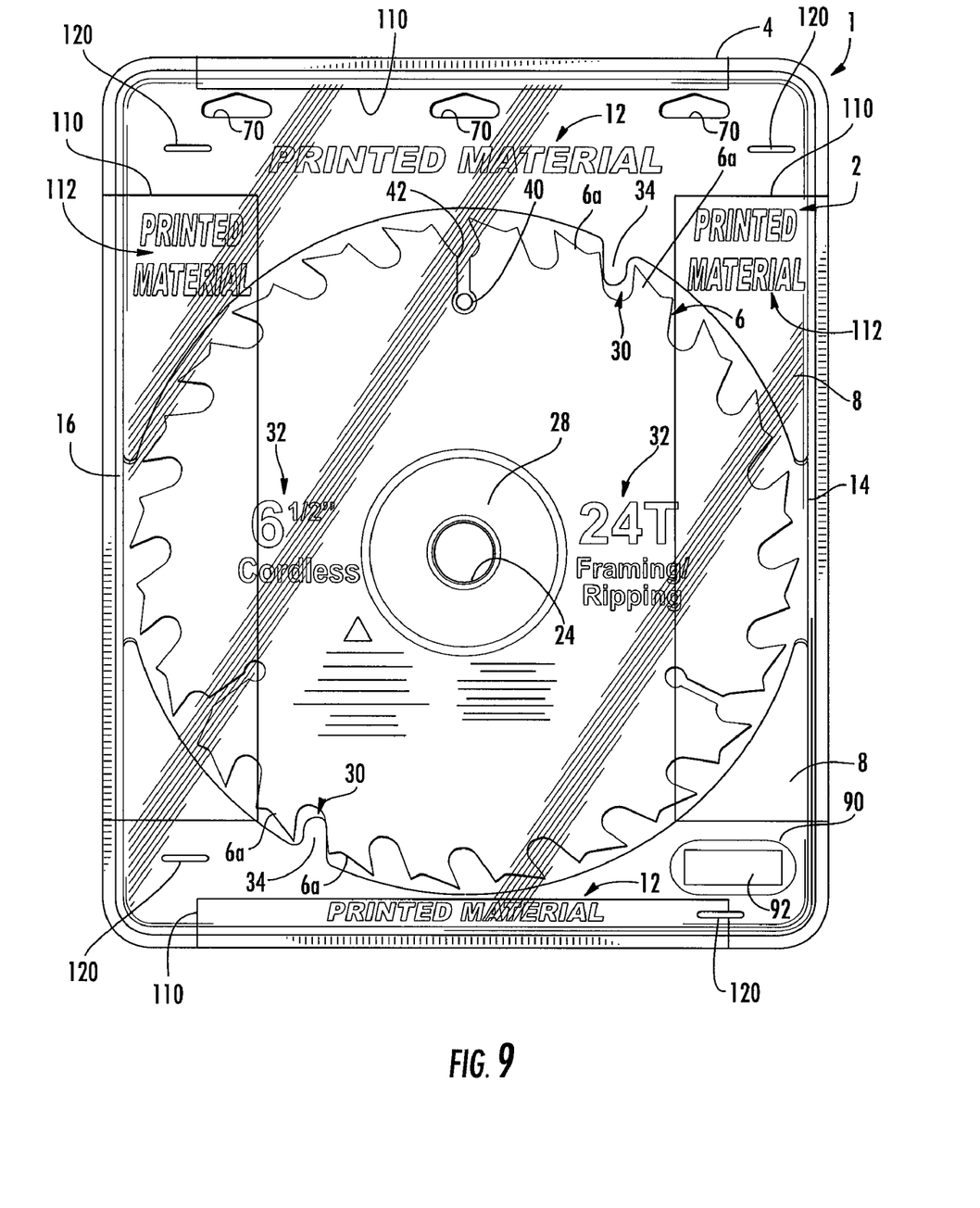
FIG. 9 is a front view of yet another embodiment of a package of the invention with a saw blade retained therein.
Figure 10:
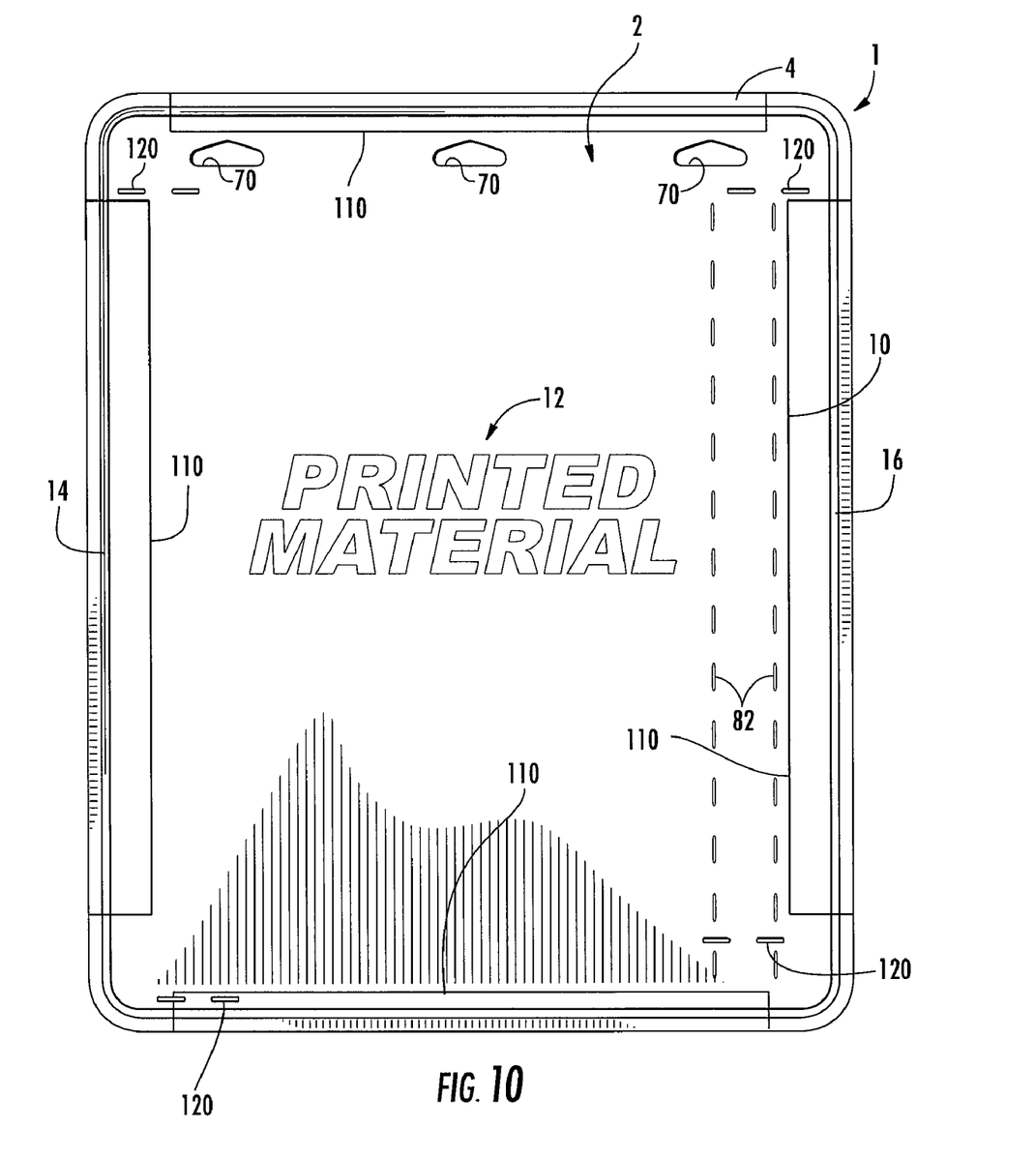
FIG. 10 is a back view of the back of the package of FIG. 9.

Referring to FIGS. 9 and 10 another embodiment of the package is shown where like reference numerals are used to refer to like components previously described with reference to FIGS. 1 through 5. The back 2 is secured to the front 4 using labels 110 where the labels have adhesive formed on the side facing the package. The labels 110 are wrapped around the edge of the package to contact and secure the front 4 to the back 2. The labels 110 may be any size and shape and may include printed material 112 including product information, graphics, pictures or the like.

FIGS. 9 and 10 also show staples 120 for securing the back 2 to the front 4 where the staples 120 penetrate both the front and the back to secure these members to one another. The embodiment shown in FIGS. 9 and 10 show the staples 120 used in conjunction with the labels 110; however, it is to be understood that the staples 120 may be used without the labels 110 and the labels 110 may be used without the staples.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A package and saw blade comprising;
   a saw blade having a plurality of teeth and vent slot;
   a paperboard back;
   a plastic front secured to the paperboard back by adhesive with the saw blade positioned between the plastic front and the paperboard back, said plastic front including a lock member for preventing rotary movement of the saw blade in the package;
   a locator peg on said plastic front in a location offset from the center of the saw blade orienting the saw blade relative to said plastic front, said locator peg engaging said vent slot; and wherein said saw blade includes and arbor hole, said plastic front being adhered to said paperboard back in said arbor hole.

2. The package and saw blade of claim 1 wherein said plastic front includes a U-shaped channel extending around the periphery thereof.

3. The package and saw blade of claim 1 wherein an edge portion of said paperboard back is not secured to an edge portion of said plastic front.

4. The package and saw blade of claim 1 wherein said plastic front includes a pocket for receiving said saw blade and a gap is formed between said plastic front and said back, said gap communicating with said pocket.

5. The package and saw blade of claim 4 wherein said gap communicates said pocket with the exterior of the package.

6. The package and saw blade of claim 1 wherein said lock member includes a protrusion that engages the blade.

7. The package and saw blade of claim 6 wherein the protrusion is located between said teeth.

8. The package and saw blade of claim 1 wherein the plastic front is secured to the paperboard back by adhesive.

9. The package and saw blade of claim 1 wherein the plastic front is secured to the paperboard back by a label.

10. The package and saw blade of claim 1 wherein the plastic front is secured to the paperboard back by a smash button.

11. The package and saw blade of claim 1 wherein the plastic front is secured to the paperboard back by a staple.

12. The package and saw blade of claim 1 wherein said paperboard back is attached to the plastic front using heat activated adhesive, said paperboard back comprising a plurality of openings to allow moisture to escape from between the paperboard back and the plastic front when heat is applied to the adhesive.

13. The package and saw blade of claim 1 wherein a recessed portion is formed in said plastic front for retaining an anti-theft device.

14. A saw-blade package for a saw blade having a plurality of teeth and a vent opening comprising;
a paperboard back;
a plastic front secured to the paperboard back by adhesive with the saw blade positioned between the plastic front and the paperboard back, said plastic front including a locating peg orienting the saw blade relative to the package, said locator peg engaging the vent opening on the saw blade;
wherein said plastic front includes a pocket for receiving the saw blade and a gap is formed between said plastic front and said paperboard back, said gap communicating said pocket with the exterior of the package where said adhesive secures the elastic front to the paperboard back over substantially the entire plastic front except for the pocket and the gap; and wherein said plastic front includes a centering protrusion, said centering protrusion being adhered to said paperboard back.

15. The package of claim 14 wherein said plastic front includes a U-shaped channel extending around the periphery thereof.

16. The package of claim 14 further comprising a lock member for preventing rotary movement of the saw blade in the package, wherein said lock member includes a protrusion that engages the blade.

17. The package of claim 16 wherein the protrusion is dimensioned to be located between the teeth of the blade.

* * * * *